No. 687,967. Patented Dec. 3, 1901.
J. C. PERRY.
METHOD OF MAKING TRUSSED WIRE FABRIC FRAMES.
(Application filed Sept. 11, 1901.)
(No Model.)
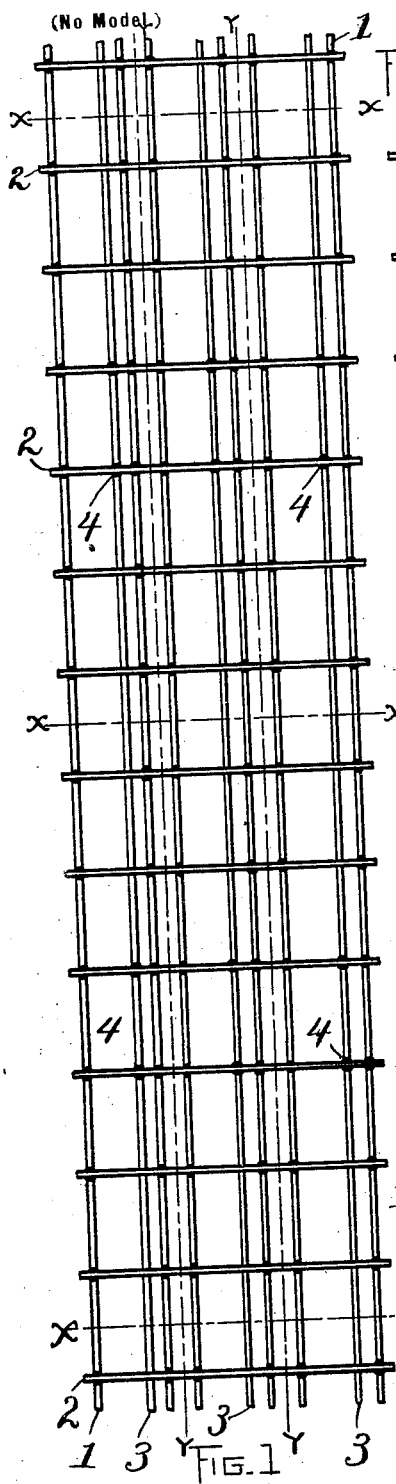
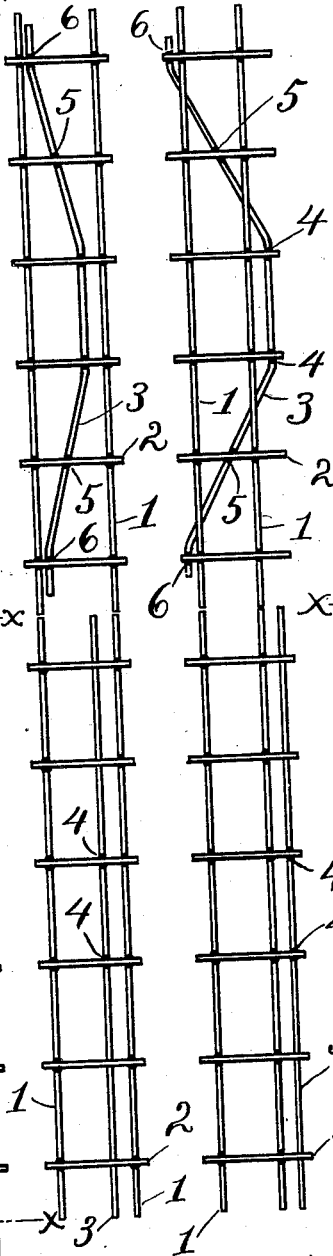
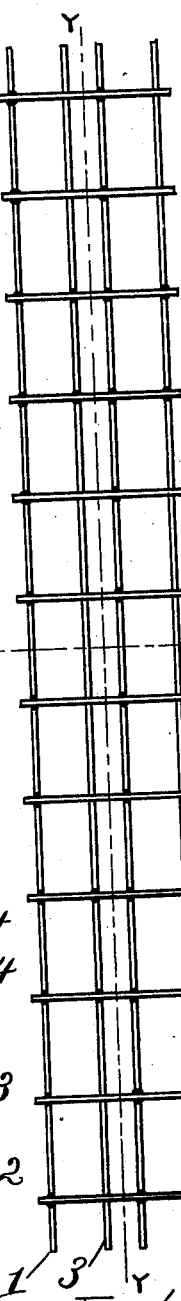
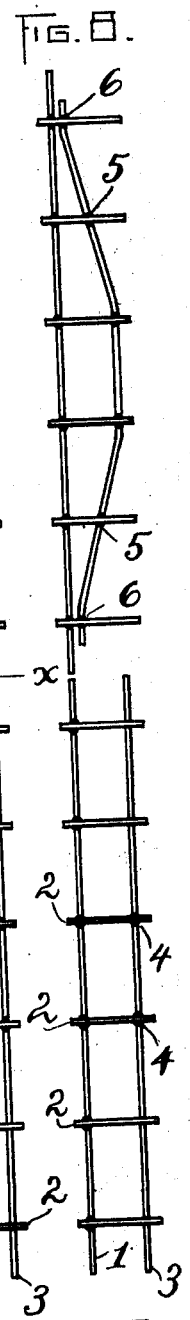
WITNESSES:
INVENTOR:
J. C. Perry

UNITED STATES PATENT OFFICE.

JOHN C. PERRY, OF CLINTON, MASSACHUSETTS.

METHOD OF MAKING TRUSSED WIRE-FABRIC FRAMES.

SPECIFICATION forming part of Letters Patent No. 687,967, dated December 3, 1901.

Application filed September 11, 1901. Serial No. 75,038. (No model.)

*To all whom it may concern:*

Be it known that I, JOHN C. PERRY, of Clinton, in the county of Worcester and State of Massachusetts, have invented certain new and useful Improvements in Methods of Making Trussed Wire-Fabric Frames, of which the following is a specification.

This invention relates to the method of making trussed wire-fabric frames for use in building or any desired relation.

Figure 1 represents a sheet of wire fabric comprising longitudinal and cross wires or members. Fig. 2 represents a portion of the construction shown in Fig. 1. Fig. 3 represents one form in which the trussed frame is constructed. Fig. 4 represents a portion of a frame having an arrangement of wires different from that shown in Fig. 1. Fig. 5 represents a trussed frame in which the truss is arranged differently from that shown in Fig. 3. Figs. 6, 7, and 8 illustrate another manner in which the truss may be formed.

The same reference characters indicate the same parts in all of the figures.

In manufacturing the described frame a sheet of welded fabric is first produced, as shown in Fig. 1, comprising longitudinal wires 1 and cross-wires 2, welded together at their points of intersection.

3 represents the wire or wires or members that are to be employed for forming the truss or strut. These wires are arranged parallel with the wires 1, but, unlike the wires 1, are not welded to each cross-wire 2, the welds 4 of the truss-wires 3 securing said wires to certain of the cross-wires 2 at predetermined points in such way as to permit that portion of the wire 3 between successive welds to be moved sidewise, as hereinafter described. After a sheet of the fabric is completed it is cut on the lines marked *x x y y*, thus forming separate frames, as shown in Figs. 2 and 4. The free ends of the wires 3 are then bent toward an adjacent wire 1 and secured in place by welds 5 6. (See Fig. 3.) The wire 3, thus arranged and welded, forms a truss or strut. In Figs. 4 and 5 the truss-wire 3 is bent at a little sharper angle and its free end secured by a weld 6 outside of the second longitudinal wire 1 instead of between the first and second longitudinal wires, as in Fig. 3.

Figs. 6, 7, and 8 show a different form of trussed frame made up of longitudinal wires 1 and cross-wires 2, welded together at their points of intersection. 3 represents truss-wires welded to a part of the cross-wires 2, leaving intervening lengths that are not welded to the cross-wires 2. After this fabric has been completed in the usual way it is cut up into sections or units along the lines *x x y y*, Fig. 6. In Fig. 7 one of these units is shown comprising one longitudinal wire 1, cross-wires 2, and one truss-wire 3, secured by welds 4 to the two intermediate cross-wires 2. The free ends of the truss-wire 3 are then carried toward the longitudinal wire 1 and secured in place by welds 5 and 6 in the manner shown in Fig. 3, this form of frame differing from the form shown in Fig. 3 in that it has only one longitudinal wire. Preferably in manufacture this fabric for the trussed frames, as shown in Figs. 1 and 6, is first made upon any preferred welding-machine and thereafter cut up and run through a welding-machine adapted to position and weld the free ends of a truss-wire in any desired way.

I have shown in the drawings certain only of the forms of trussed frames by way of illustration, it being evident that the truss-wire may be arranged in numberless ways, depending upon the use to which the frame is to be put, the character of the wire, &c.

While I prefer for the sake of economy to manufacture my improved frame by suitable welding-machines, manifestly it may be made by hand.

Having thus explained the nature of my invention and described a way of constructing and using the same, though without attempting to set forth all the forms in which it may be made or all the modes of its use, what I claim, and desire to secure by Letters Patent, is—

1. The method of making a diagonally-braced truss which consists in welding together a series of longitudinal and cross wires to form a meshed fabric and leaving some of the intersections of certain of the cross-wires with one or more longitudinal wires unwelded, subsequently cutting the fabric into panels, bending the wires where not welded to the cross-wires into a diagonal position to form a diagonal tie or brace, and welding the diagonals in the new position to the cross or longitudinal wires.

2. The method of making a diagonally-braced truss which consists in welding together a series of longitudinal and cross wires, leaving some of the intersections of the cross-wires with one or more of the longitudinal wires unwelded to form truss-wires, cutting the truss wire or wires and bending the same into a diagonal position and then welding the same to cross wire or wires to form a diagonal tie or brace.

In testimony whereof I have affixed my signature in presence of two witnesses.

JOHN C. PERRY.

Witnesses:
    E. BATCHELDER,
    P. W. PEZZETTI.